United States Patent
Kim et al.

(10) Patent No.: US 12,454,190 B2
(45) Date of Patent: Oct. 28, 2025

(54) ACCESS FLOOR EQUIPPED WITH A SYSTEM FOR WIRELESS CHARGING OF A ROBOT AND A BUILDING INCLUDING SAME

(71) Applicant: NAVER CORPORATION, Seongnam-si (KR)

(72) Inventors: Minsu Kim, Seongnam-si (KR); Joonho Seo, Seongnam-si (KR)

(73) Assignee: NAVER CORPORATION, Gyeonggi-Do (KR)

(*) Notice: Subject to any disclaimer, the term of this patent is extended or adjusted under 35 U.S.C. 154(b) by 0 days.

(21) Appl. No.: 18/590,593

(22) Filed: Feb. 28, 2024

(65) Prior Publication Data
US 2024/0198829 A1 Jun. 20, 2024

Related U.S. Application Data

(63) Continuation of application No. PCT/KR2022/013020, filed on Aug. 31, 2022.

(30) Foreign Application Priority Data
Sep. 1, 2021 (KR) .................. 10-2021-0116115

(51) Int. Cl.
*H02J 50/80* (2016.01)
*B60L 53/12* (2019.01)
(Continued)

(52) U.S. Cl.
CPC ............... *B60L 53/31* (2019.02); *B60L 53/12* (2019.02); *B60L 53/302* (2019.02); *B60L 53/36* (2019.02);
(Continued)

(58) Field of Classification Search
CPC ........ B60L 53/31; B60L 53/12; B60L 53/302; B60L 53/36; B60L 53/66; G05D 1/244;
(Continued)

(56) References Cited

U.S. PATENT DOCUMENTS

| 10,044,196 B1 * | 8/2018 | Worley, III | ............ H02J 50/12 |
| 10,988,940 B2 * | 4/2021 | Byrne | ..................... H02J 50/05 |

(Continued)

FOREIGN PATENT DOCUMENTS

| KR | 10-2011-0130938 | 12/2011 |
| KR | 10-2018-0013026 | 1/2019 |

(Continued)

OTHER PUBLICATIONS

Office Action issued by the Korean Patent Office in corresponding KR Application No. 10-2021-0116115, dated May 28, 2023.
(Continued)

*Primary Examiner* — Daniel Kessie
*Assistant Examiner* — Brian K Baxter
(74) *Attorney, Agent, or Firm* — Harness, Dickey & Pierce, P.L.C.

(57) ABSTRACT

An access floor system including an access floor section that includes a wireless charging unit which is configured for wirelessly charging at least one robot capable of moving in a building; and a communication unit which communicates with a charging control system for controlling the robot and/or charging of the robot. The wireless charging unit of the access floor section is connected to a power line under the floor surface, and the communication unit of the access floor is connected to a communication line under the floor surface.

19 Claims, 5 Drawing Sheets

(51) Int. Cl.
    *B60L 53/302*     (2019.01)
    *B60L 53/31*     (2019.01)
    *B60L 53/36*     (2019.01)
    *B60L 53/66*     (2019.01)
    *G05D 1/244*     (2024.01)
    *E04F 15/024*     (2006.01)
    *G05D 107/60*     (2024.01)
    *G05D 111/10*     (2024.01)

(52) U.S. Cl.
    CPC .............. *B60L 53/66* (2019.02); *G05D 1/244* (2024.01); *H02J 50/80* (2016.02); *E04F 15/02405* (2013.01); *G05D 2107/60* (2024.01); *G05D 2111/14* (2024.01)

(58) Field of Classification Search
    CPC . G05D 2107/60; G05D 2111/14; H02J 50/80; E04F 15/02405
    See application file for complete search history.

(56) References Cited

U.S. PATENT DOCUMENTS

| | | | |
|---|---|---|---|
| 11,984,731 B2* | 5/2024 | Makwinski | H02J 50/12 |
| 2007/0109708 A1* | 5/2007 | Hussman | H02J 1/002 |
| | | | 361/113 |
| 2008/0238216 A1* | 10/2008 | Heidmann | E04F 15/02 |
| | | | 307/145 |
| 2012/0282065 A1* | 11/2012 | Virk | B60L 50/52 |
| | | | 414/222.13 |
| 2013/0293025 A1* | 11/2013 | Xu | H02J 50/402 |
| | | | 307/104 |
| 2014/0021798 A1* | 1/2014 | Kesler | H02J 50/80 |
| | | | 307/104 |
| 2015/0025690 A1* | 1/2015 | Abuelsaad | H05K 7/20745 |
| | | | 700/276 |
| 2015/0084426 A1* | 3/2015 | Wechlin | H02J 50/70 |
| | | | 307/104 |
| 2016/0181859 A1* | 6/2016 | Makwinski | H02J 50/12 |
| | | | 320/108 |
| 2018/0205267 A1* | 7/2018 | Takeda | H02J 50/12 |
| 2018/0251035 A1* | 9/2018 | Baumer | B60L 53/12 |
| 2018/0254136 A1* | 9/2018 | Ueda | H01F 27/28 |
| 2018/0323636 A1* | 11/2018 | Makwinski | H02J 7/0042 |
| 2019/0363578 A1* | 11/2019 | Hume | H02J 7/04 |
| 2020/0033879 A1* | 1/2020 | Mushegian | G05D 1/0234 |
| 2022/0045464 A1* | 2/2022 | Leahy | H01R 13/6683 |
| 2022/0140662 A1* | 5/2022 | Moon | H02J 50/005 |
| | | | 320/108 |
| 2022/0328232 A1* | 10/2022 | Lee | H02J 50/005 |
| 2022/0337089 A1* | 10/2022 | Powell, Jr. | H01F 27/025 |
| 2023/0326670 A1* | 10/2023 | Meier | H02J 50/40 |
| | | | 307/104 |
| 2024/0190277 A1* | 6/2024 | Smith | H05K 7/20145 |

FOREIGN PATENT DOCUMENTS

KR            10-2102573          4/2020
KR     10-2020-0108825          2/2023

OTHER PUBLICATIONS

Notice of Allowance issued by the Korean Patent Office in corresponding KR Application No. 10-2021-0116115, dated Aug. 31, 2023.

* cited by examiner

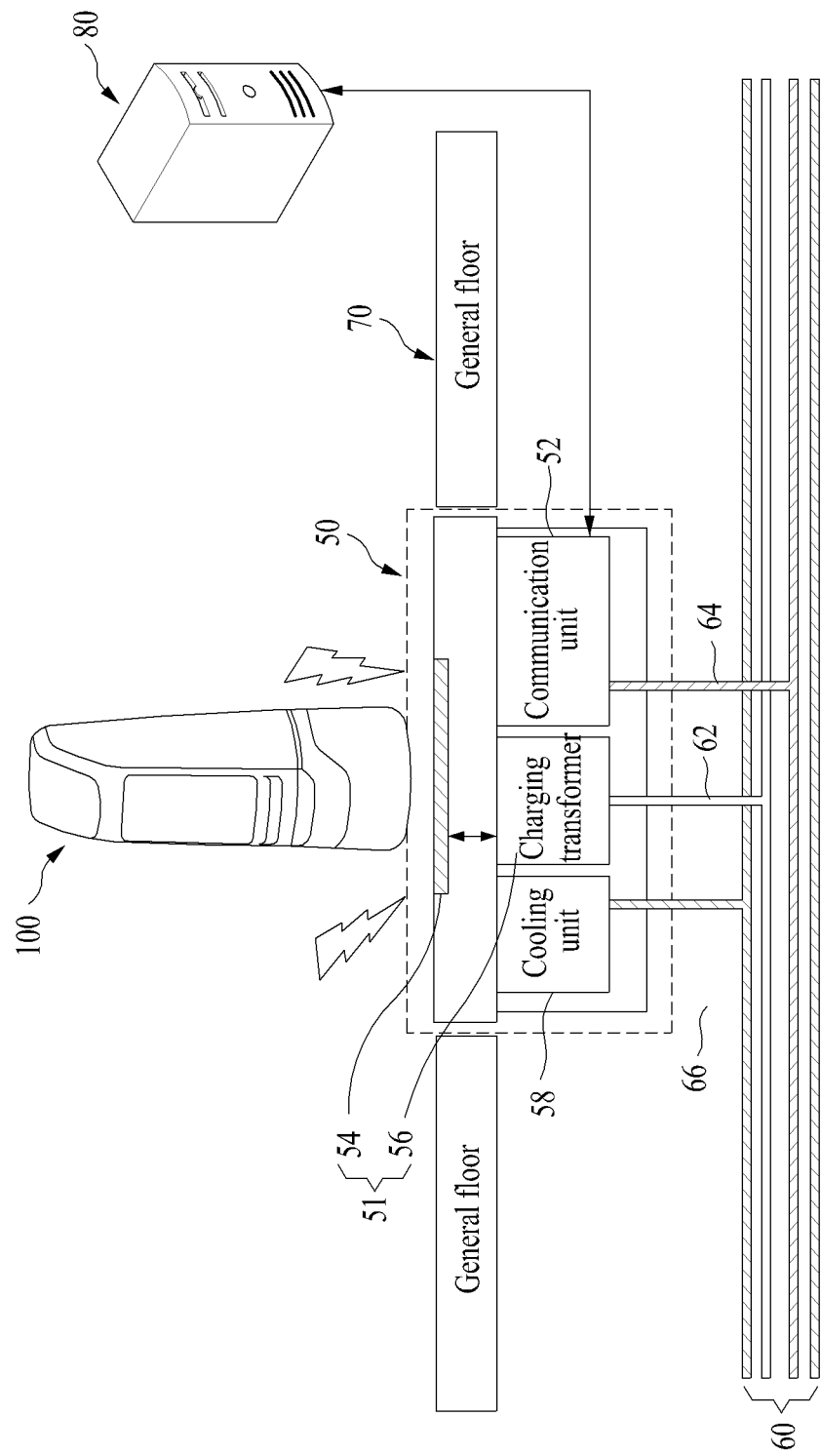

ACCESS FLOOR EQUIPPED WITH A SYSTEM FOR WIRELESS CHARGING OF A ROBOT AND A BUILDING INCLUDING SAME

BACKGROUND OF THE INVENTION

The following description relates to an access floor system including an access floor section equipped with a device for wireless charging of a robot and a building including the same, and more particularly, to an access floor system including an access floor section that enables wireless charging of a robot through connection to wiring/piping of the floor of a building and the building including the same.

An autonomous driving robot refers to a robot that finds an optimal route to a destination using its wheels or legs while looking around on its own and detecting obstacles, and such a robot is being developed and utilized in a variety of fields, such as in the fields of autonomous driving vehicles, logistics, hotel services, and robot cleaners.

A robot used to travel in a building and provide a service in the building requires charging at a certain point, based on on its use. During the charging process, the robot moves to a predetermined location, such as a charging dock in the building, and the robot is then charged at that predetermined location. After charging, the robot provides a service while traveling again within the building.

However, providing the charging dock for charging the robot in a separate space is not efficient in terms of a space, and is also not desirable from an aesthetic point of view, when considered in regard to the interior design of the building or other space.

Therefore, when arranging a space for charging of a robot within a building, there is a need for a charging system for the robot that may improve space efficiency without compromising the aesthetics of the interior design of the building or other space.

Korean Patent Laid-Open Publication No. 10-2020-0108825 relates to a method and system for docking a robot to a charger docking station, and describes a method for navigating the robot for docking with the robot charger docking station.

The aforementioned information is provided to help understanding and may include contents that do not form a portion of the related art and may not include contents that the related art may propose to one of ordinary skill in the art.

BRIEF SUMMARY OF THE INVENTION

Example embodiments of the present invention provide an access floor system including an access floor section with a wireless charging unit configured to wirelessly charge at least one robot moving in a building and/or a communication unit configured to communicate with a charging control system that controls charging of the robot in conjunction with an access floor section installed in association with the floor of the building.

Example embodiments provide a building in which an access floor section is directly connected to a power line under the floor along with a communication line under the floor, and the building including the access floor section including a wireless charging unit that is configured to wirelessly charge at least one robot moving in the building and/or a communication unit configured to communicate with a charging control system that controls charging of the robot.

According to one aspect of the invention, there is provided an access floor section installed on the floor of a building, the access floor section including a wireless charging unit configured to wirelessly charge at least one robot moving in the building; and a communication unit configured to communicate with at least one of the robot and a charging control system that controls charging of the robot, wherein the wireless charging unit is configured to connect to a power line under the floor, and the communication unit is configured to connect to a communication line under the floor.

The wireless charging unit may include a wireless charging pad and a wireless charging transformer.

A top plate exposed to the exterior of the access floor section (i.e., above the access floor section) may be provided on the wireless charging pad, and the top plate associated with the wireless charging pad may be made of the same material as that of another top plate of a general floor section that is installed on the floor level of the building adjacent to the access floor section, and both types of top plates may be configured with the same specifications.

The access floor section may further include a cooler configured to connect to a ventilation line or a cooling line under the floor. The cooler may be configured to cool the wireless charging unit when charging the robot.

The cooler may be configured to connect to a ventilation duct or pipe for ventilating the building as the ventilation line, or to connect to an air conditioning line or pipe for cooling the building as the cooling line.

The access floor section may be installed on the floor and it may be configured to be detachable for maintenance of the power line and the communication line under the floor, and the access floor section may be configured to be installable at another location on the floor by connecting the wireless charging unit to a power line under another location on the floor and by connecting the communication unit to a communication line under another location on the floor.

A marker recognizable by the robot may be provided on a top surface exposed to the exterior of the access floor section, and after the robot recognizes the marker and moves on the access floor section, the robot may be charged by the wireless charging unit.

The marker may include an infrared ray (IR) pattern that is not identifiable with the naked eye, but that is identifiable by the robot, and the IR pattern may be projected by an IR pattern irradiation device that irradiates an IR onto the top surface of the access floor section.

A wired charging unit configured to charge the robot in a wired manner may be further provided on a top surface exposed to the exterior of the access floor section, the wired charging unit may be connected to the power line, and the wired charging unit may include a terminal to which the robot can be connected to for charging.

According to another aspect, there is provided a building in which at least one robot moves, the building including at least one access floor section installed on the floor of the building; and at least one general floor section installed on the floor to be adjacent to the access floor section, wherein the access floor section includes a wireless charging unit configured to wirelessly charge at least one robot moving in the building; and a communication unit configured to communicate with at least one of the robot and a charging control system that controls charging of the robot, wherein the wireless charging unit is configured to connect to a power line under the floor, and the communication unit is configured to connect to a communication line under the floor.

According to some example embodiments, it is possible to not visibly expose a device for charging a robot (e.g., a charging dock) to people within a building by including a wireless charging unit for wirelessly charging the robot and a communication unit in an access floor section installed on the floor of a building, and by directly connecting the access floor section to a power line under the floor and a communication line under the floor.

According to some example embodiments, it is possible to promote design efficiency within a building and to improve the aesthetics of a floor design of the building by providing a wireless charging function for a robot and by providing an access floor section that is indistinguishable from one or more general floor sections.

According to some example embodiments, it is possible to provide an access floor section that provides a wireless charging function for a robot, which is easy to install/maintain/move with minimal wiring, by directly connecting a wireless charging unit of the access floor section to a power line under the floor, and by also including a communication unit to a communication line under the floor and a cooler for cooling the wireless charging unit, wherein the cooler is associated with a ventilation line or a cooling line under the floor.

BRIEF DESCRIPTION OF THE DRAWINGS

FIG. 1B illustrates a method of wirelessly charging a robot through an access floor section according to an example embodiment.

DETAILED DESCRIPTION OF THE INVENTION

Hereinafter, example embodiments will be described in detail with reference to the accompanying drawings.

Figure 1A:
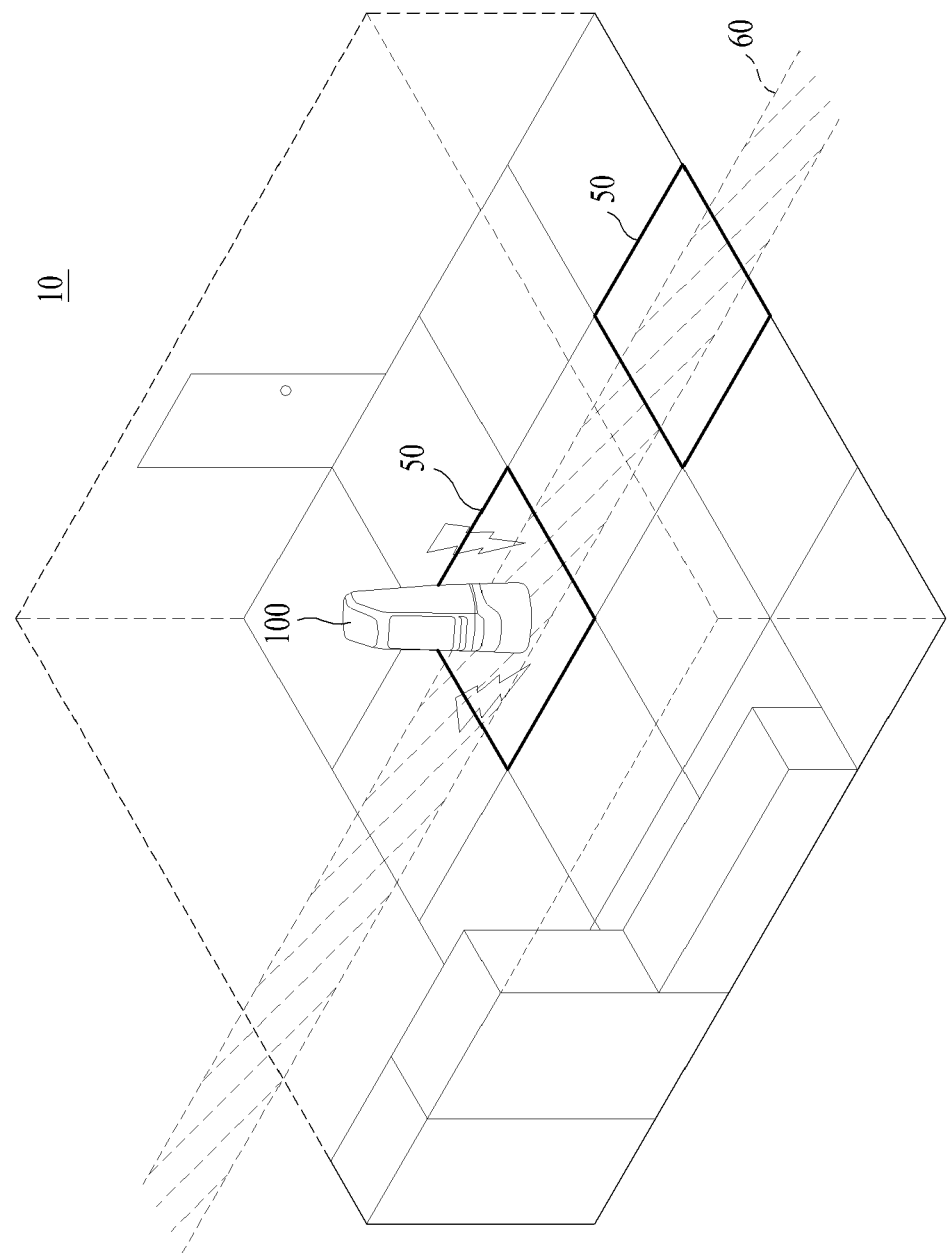
FIG. 1A illustrates the interior of a building in which an access floor section that provides a wireless charging function for a robot is installed according to an example embodiment.

FIG. 1A illustrates the interior of a building in which an access floor section that provides a wireless charging function for a robot has been installed according to an example embodiment.

Initially, a robot 100 that is charged by an access floor section 50 configured and arranged for providing a wireless charging function (i.e., a battery of the robot 100 is wirelessly charged) is described.

The robot 100 shown in FIG. 1A may be a service robot configured to provide a service within, for example, a building 10, or another space, such as indoors or within other open areas.

A space in which the robot 100 travels refers to a space in which the robot 100 provides a service and may represent, for example, the building 10. This space refers to a space in which a plurality of persons (hereinafter, referred to as users) work or reside, and may include a plurality of partitioned sub-spaces. The space in which the robot 100 travels may represent a portion (such as a specific floor or a partial space within a corresponding floor) of the building 10. The robot 100, the service robot, may be configured to provide a service on at least one floor of the building 10.

The service provided from the robot 100 may include, for example, at least one of a parcel delivery service, an order-based beverage (coffee, etc.) delivery service, a cleaning service, and/or other information/content providing services.

The robot 100 may provide a service at a predetermined location and/or to a predetermined user in a space through autonomous driving.

The robot 100 may be configured to perform a specific function or to perform a task related to the providing of the service under control of a robot control system 120 to be described below with reference to FIGS. 2 and 3. The robot 100 may move to a specific location, or may execute other tasks or functions as required to provide the service under control of the robot control system 120. The robot control system 120 may be configured to control each of a plurality of robots. Here, within the space, each of the robots may move and provide a service at an appropriate location in the space and/or to an appropriate user.

The robot 100 may be a brainless robot that runs by executing a low-level control command from the robot control system 120. Here, the robot control system 120 may be implemented as a robot brain (brain system) that controls such a brainless robot. Therefore, the robot 100 may include only components configured to transmit collected sensing data (raw sensing data) to the robot control system 120, to receive the low-level control command from the robot control system 120, and to operate a driving unit, and thus may not include a component such as a complex on-board computer system.

The structure and a detailed operation of the robot 100 and the robot control system 120 will be further described below with reference to FIGS. 2 and 3.

Then, as an access floor section 50 installed on the floor of the building 10, the access floor section 50 that provides a wireless charging function for the robot 100 will be described.

The access floor section 50 may represent a part of a system that includes a double floor structure (also referred to as a raised floor system or structure) for installing a wiring/piping unit 60 that includes piping and wiring for operating various facilities in the building 10 on the floor of the interior of the building 10 (e.g., a disaster prevention room, a computer room, a conference room, or general office space). The access floor section 50 may represent a structure for facilitating maintenance of the wiring/piping unit 60 and access/management of wiring and piping. That is, the wiring/piping unit 60 may be easily maintained and managed through the access floor section 50.

As illustrated, the access floor section 50 described herein may refer to a device that is configured by including a top plate (e.g., a cover of the access floor section) that is exposed to the exterior of the floor and that includes components (directly) connected to the wiring/piping unit 60. That is, the access floor section 50 of the example embodiment may include components configured to (directly) connect to the wiring/piping unit 60, and to provide a function for wirelessly charging the at least one robot 100, and may also provide a space for maintaining and managing the wiring/piping unit 60.

A plurality of access floor sections 50 may be provided (according to an arrangement of the wiring/piping unit 60) in the interior of the building 10, and each of the access floor sections 50 may be configured to provide a function for wirelessly charging the robot 100. A single access floor section 50 may be configured to wirelessly charge a single robot 100. Alternatively, in certain example embodiments, the access floor section 50 may be configured to wirelessly charge a plurality of robots at the same time. Alternatively, the access floor section 50 may further include a component for charging the at least one robot 100 in a wired manner and may be configured to charge the robot 100 in a wired or wireless manner according to the type of robot 100 (e.g., depending on whether the robot 100 supports wireless charging) or to charge the plurality of robots by simultaneously using a wired charging function and a wireless charging function.

A method of charging the robot 100 through the access floor section 50 will be further described below with reference to FIGS. 1B, 4, and 5.

In an example embodiment, there may be provided a charging system for the robot 100 having a seamless exterior design without a separate dock or cable exposed on the exterior of the floor by arranging components for wirelessly charging the robot 100 on the access floor section 50 to directly connect to the wiring/piping unit 60 within the floor. The access floor section 50 that provides the wireless charging function may not be visually distinguished from other general floor sections adjacent to the access floor section 50. Therefore, by applying the access floor section 50 of the example embodiment to the building 10, it is possible to promote the indoor space efficiency and to improve the degree of freedom in interior design.

FIG. 1B illustrates a method of wirelessly charging a robot through an access floor section according to an example embodiment.

As illustrated, the access floor section 50 may be configured to wirelessly charge the robot 100 when the robot 100 is located on the access floor section 50.

The access floor section 50 may include a wireless charging unit 51 configured to wirelessly charge the at least one robot 100, and a communication unit 52 configured to communicate with the robot 100 and/or a charging control system 80 that controls charging of the robot 100.

The wireless charging unit 51 (or a not-shown power unit configured to supply power to the access floor section 50 and the wireless charging unit 51) may be connected to a power line 62 of the wiring/piping unit 60 installed under the floor. The wireless charging unit 51 may include a wireless charging pad 54 for wireless charging of the robot 100, and a wireless charging transformer 56 for wireless charging of the robot 100. The wireless charging transformer 56 may be connected to the power line 62. The power line 62 may be wiring for providing power to operate various facilities in the building 10. For example, the power line 62 may be a 220V power line, or other suitable power line. The wireless charging unit 51 (or the wireless charging transformer 56) may include a connector for connection to the power line 62 and this connector may be connected to a corresponding connector of the power line 62.

The communication unit 52 may be (directly) connected to a communication line 64 of the wiring/piping unit 60 installed under the floor. The communication line 64 may be wiring for providing communication between various facilities in the building 10 or for providing communication with an external facility (or device). For example, the communication line 64 may be a network cable (e.g., UDP (user datagram protocol) cable). The communication unit 52 may include a connector for connection to the communication line 64 and this connector may be connected to a corresponding connector of the communication line 64.

In response to connection to the communication line 64, the communication unit 52 may communicate with the charging control system 80 and/or the robot 100. For example, when the robot 100 is located on the wireless charging pad 54, the access floor section 50 may control charging of the robot 100 (e.g., start or suspension of charging) in response to a control signal received by the communication unit 52 from the charging control system 80.

The charging control system 80 may include at least one computing device (such as a processor and memory) and may be implemented within a space (i.e., the building 10) in which the robot 100 travels, or there may be at least one server (or cloud server) located outside of the space (i.e., the building 10). The charging control system 80 may be configured as a portion of the robot control system 120 to be described below with reference to FIGS. 2 and 3, or may be configured as a computing device separate from the robot control system 120.

For example, the access floor section 50 may be controlled in response to a control signal from the robot control system 120 to charge the robot 100 for a predetermined period of time, and/or by a predetermined charge amount, according to communication between the robot control system 120 and the robot 100.

When the robot 100 is located on the wireless charging pad 54 (e.g., when the robot 100 is determined to be located on the wireless charging pad 54 by a sensor included in the wireless charging pad 54), the robot 100 may notify the robot control system 120 that the robot 100 is located on the wireless charging pad 54. Subsequently, the access floor section 50 may be controlled based on the control signal from the robot control system 120 to charge the robot 100 for the predetermined period of time and/or by the predetermined charge amount.

The communication unit 52 of the access floor section 50 may be configured to further include, for example, a hardware module, such as an antenna, a data bus, a network interface card, a network interface chip, and a networking interface port, or a software module, such as a network device driver or a networking program, as a component for communication between the access floor section 50 and the robot 100 or the charging control system 80.

A top plate exposed to the exterior of the floor may be provided on the wireless charging pad 54 of the access floor 50. The top plate may correspond to the interior flooring of the building 10. For example, the top plate may be wood, plastic, flooring, tile (marble tile, porcelain tile, stone time, etc.), and the like.

The top plate of the access floor section 50 may be made of the same material as that of a top plate exposed to the exterior of a general floor section (i.e., a general floor section other than the access floor section 50) installed on the floor of the building 10 adjacent to the access floor section 50 (or present on the same floor as the access floor 50), and may be configured to have the same specifications. For example, the size of the top plate may be 600 mm×600 mm, or any other suitable size.

That is, the flooring that constitutes the access floor section 50 of the example embodiment may have the same material and dimensions as those of the flooring that constitutes the general floor sections. Therefore, the access floor section 50 may be recognized as the same as the general floor sections with a naked eye. In certain embodiments, the access floor section 50 may include a visually identifiable identification marker (such as a number, an identification symbol, etc.) on the top plate (or surface) exposed to the exterior for distinguishment from the general floor section.

The access floor section 50 may further include a cooler 58 for cooling the wireless charging unit 51 when charging the robot 100. The cooler 58 may be a component configured to reduce the heat generated from the wireless charging transformer 56 of the wireless charging unit 51. The cooler 58 may be connected to a ventilation line 66 or a cooling line 66 included in the wiring/piping unit 60. The cooler 58 may cool the wireless charging unit 51 using ventilation from the ventilation line 66 or by using a refrigerant (cooled air, cooling water or other refrigerants) from the cooling line 66.

The cooler 58 may be connected to a ventilation duct or pipe for ventilating the building 10 as the ventilation line 66, and may cool the wireless charging unit 51 using ventilation that flows through the ventilation line 66.

Alternatively, the cooler 58 may be connected to an air conditioning line or pipe for cooling the building 10 as the cooling line 66 and may cool the wireless charging unit 51 using the same cooled air or refrigerant used for cooling the building 10.

The cooler 58 may include a connector for connection to the ventilation line 66 or the cooling line 66, and this connector may be connected to a corresponding connector of the ventilation line 66 or the cooling line 66.

The cooler 58 may be configured to include a pump or a fan for pumping air from the ventilation line 66 or the cooling line 66 or for circulating the same around the wireless charging unit 51 (wireless charging transformer 56).

By including the cooler 58 as in the example embodiment, the air/refrigerant used to ventilate/cool the inside of the building 10 may also be used to cool the wireless charging unit 51, so the wireless charging efficiency of the robot 100 may be maximized. Also, a wireless charging system may not include a separate cooling facility and may improve the cooling efficiency compared to a wireless charging system that simply uses a fan to cool a wireless charging unit.

As described above, through the access floor section 50 of the example embodiment, it is possible to satisfy the space efficiency and aesthetics of the interior of the building 10 and to enable effective wireless charging of the robot 100.

Further, a plurality of access floor sections 50 that provide the wireless charging function of the example embodiment may be provided on a single floor of the building 10.

Also, the access floor section 50 that provides the wireless charging function of the example embodiment may be provided on a maintenance station floor that is a separately provided floor dedicated to perform maintenance of the robot 100 among floors of the building 10.

Figure 2:
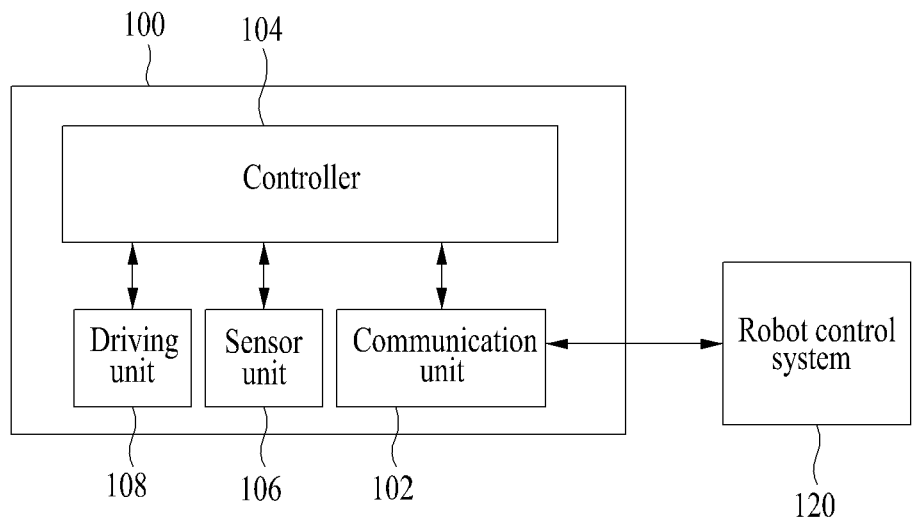
FIG. 2 is a block diagram illustrating a robot that provides a service within a building according to an example embodiment.

Description related to technical features made above with reference to FIG. 1A may be applied as is to FIG. 2 and thus, further description is omitted.

FIG. 2 is a block diagram illustrating a robot according to an example embodiment.

As described above, the robot 100 may be a service robot used to provide a service within a space. The robot 100 may be configured to provide a service at a predetermined location and/or to a predetermined user in the space through autonomous driving.

The robot 100 may be a physical device and, as illustrated, may include a controller 104, a driving unit 108, a sensor unit 106, and a communication unit 102.

The controller 104 may be a physical processor or an onboard computer system built into the robot 100. The controller 104 may include only the components required for the robot 100 implemented as the brainless robot to transmit data to the robot control system 120 and to process commands received from the robot control system 120 (e.g., transmission to the driving unit 108 and/or sensor unit 106) through communication with the robot control system 120.

For example, the controller 104 may include only the components required to transmit raw sensing data collected through the sensor unit 106 to the robot control system 120, to receive low-level control commands from the robot control system 120, and to operate the driving unit 108. That is, the controller 104 may not include a complex component (e.g., GPU) required to interpret and process sensing data and a control command.

The controller 104 may include a sensor driver for the sensor unit 106 and a driving unit driver for the driving unit 108.

The communication unit 102 may be a component for communication between the robot 100 and another device (such as the robot control system 120). That is, the communication unit 102 may be a hardware module, such as an antenna, a data bus, a network interface card, a network interface chip, and a networking interface port of the robot 100, or a software module, such as a network device driver or a networking program, to transmit/receive data and/or information to/from the other device, such as the robot control system 120.

For example, the communication unit 102 refers to a wireless communication unit for communicating with the robot control system 120, and may transmit unprocessed data including (raw) sensing data to the robot control system 120 and may receive control commands for the driving unit 108 from the robot control system 120.

The sensor unit 106 may be a component for collecting data required for autonomous driving and service provision of the robot 100. The sensor unit 106 may lack expensive sensing equipment, but it may include a sensor, such as a low-cost ultrasonic sensor and/or a low-cost camera.

The sensor unit 106 may include a sensor for identifying an object, such as another robot, a person, and an obstacle in front and/or from behind. For example, the other robot, person, and other objects may be identified through a camera of the sensor unit 106. Alternatively, the sensor unit 106 may include an infrared sensor (or an infrared camera). The sensor unit 106 may further include a sensor for recognizing/identifying a nearby user, another robot, or object in addition to the camera. Also, the sensor unit 106 may include at least one distance sensor for identifying the distance to object(s) present in a surrounding area. Other sensor units may include a sensor for verifying a state of the robot 100 and recognizing an environment, including an odometer.

(Raw) sensing data from sensors of the sensor unit 106 may be transmitted to the robot control system 120 through the communication unit 102. For example, the sensing data may be transmitted to the robot control system 120 through the sensor driver (or sensor hub) of the controller 104 and through the communication unit 102.

The driving unit 108 may include, as a component configured to control movement of the robot 100 and to enable the movement, equipment (hardware) for performing the same. Also, the driving unit 108 may include equipment (hardware) for performing the functions required for the robot 100 to perform tasks related to a requested service.

For example, the driving unit 108 may include at least one motor and/or at least one actuator for operating wheels, caterpillar wheels, legs, and the like for movement of the robot 100.

Also, the driving unit 108 may include equipment related to a service provided from the robot 100. For example, to perform a food/parcel delivery service, the driving unit 108 of the robot 100 may include a component for loading food/parcels or a component (e.g., robot arm) for delivering food/parcels to a user. Also, the robot 100 may further include a speaker and/or a display to provide information/content.

The driving unit 108 may be controlled in response to a control command from the robot control system 120. The driving unit 108 may perform an operation corresponding to a corresponding control command by executing a low-level control command received from the robot control system 120. For example, when the low-level control command from the robot control system 120 is input to the driving unit 108, the driving unit 108 may perform the operation indicated by the corresponding control command.

The control command from the robot control system 120 may be transmitted to the driving unit 108 through the communication unit 102. For example, the control command from the robot control system 120 may be received through the communication unit 102, and may be transmitted to each component (e.g., each motor and/or actuator) of the driving unit 108 by way of the driving unit driver of the controller 104.

As described above, the robot 100 may be controlled by simply transmitting sensing data from the sensor unit 106 to the robot control system 120, and by receiving the control command from the robot control system 120 and thus, may be a brainless robot (controlled by the robot control system 120 corresponding to a brain).

Meanwhile, each robot 100 may have a different size and shape (i.e., different types of the sensor unit 106 and/or driving unit 108) according to model or service provided by the corresponding robot 100.

A configuration and an operation of the robot control system 120 that controls the robot 100 will be further described below with reference to FIG. 3.

Description related to technical features made above with reference to FIGS. 1A and 1B may be applied as is to FIG. 2 and thus, repeated description is omitted.

Figure 3:
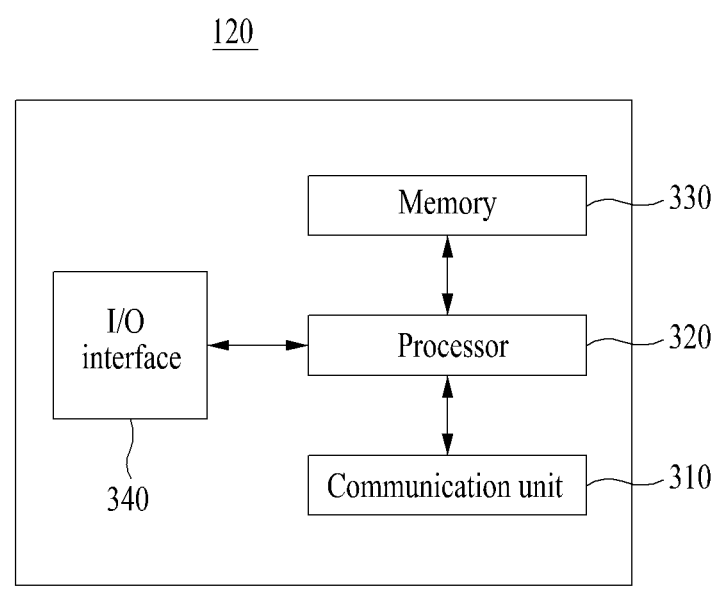
FIG. 3 is a block diagram illustrating a robot control system that controls a robot providing a service according to an example embodiment.

FIG. 3 is a block diagram illustrating a robot control system that controls a robot providing a service according to an example embodiment.

The robot control system 120 may be a device that controls the aforementioned movement (i.e., driving) of the robot 100 within the space and the service provision of the robot 100 in the space. When the number of robots 100 is plural, the robot control system 120 may control movement of each of the plurality of robots and the service provision of each robot 100.

The robot control system 120 may plan and set a route through which the robot 100 needs to move to provide a service through communication with the robot 100, and may transmit a control command for movement according to the route to the robot 100. The robot 100 may move to a predetermined location or a predetermined user in response to the received control command. Also, the robot 100 may provide a service (i.e., perform a task related to the service) at the predetermined location or to the predetermined user under control of the robot control system 120.

The robot control system 120 may include at least one computing device.

As described above, the robot control system 120 may be a device that plans and sets a route for travelling, that is, driving of the robot 100, and that controls movement of the robots 100. The robot control system 120 may include at least one computing device and may be implemented as at least one server (e.g., cloud server) located inside the space (i.e., building 10) in which the robot 100 travels or the server may be located outside of the space (i.e., building 10).

The robot control system 120 may include a memory 330, a processor 320, a communication unit 310, and an input/output (I/O) interface 340.

The memory 330 may include a permanent mass storage device, such as a random access memory (RAM), a read only memory (ROM), and a disk drive, as a computer-readable recording medium. Here, the permanent mass storage device, such as ROM and a disk drive, may be included as a permanent storage device separate from the memory 330. Also, an operating system (OS) and at least one program code may be stored in the memory 330. Such software components may be loaded from another computer-readable recording medium separate from the memory 330. The other computer-readable recording medium may include a computer-readable recording medium, for example, a floppy drive, a disk, a tape, a DVD/CD-ROM drive, a memory card, etc. According to other example embodiments, software components may be loaded to the memory 330 through the communication unit 310, instead of from the computer-readable recording medium.

The processor 320 may be configured to process instructions of a computer program by performing basic arithmetic operations, logic operations, and I/O operations. The instructions may be provided from the memory 330 or the communication unit 310 to the processor 320. For example, the processor 320 may be configured to execute received instructions in response to the program code loaded to the memory 330.

The communication unit 310 may be a component for communication between the robot control system 120 and another device (robot 100 or another server). That is, the communication unit 310 may be a hardware module, such as an antenna, a data bus, a network interface card, a network interface chip, and a networking interface port of the robot 100, or a software module, such as a network device driver or a networking program, to transmit/receive data and/or information to/from the other device.

For example, the communication unit 310 may receive unprocessed data including (raw) sensing data from the robot 100 and may transmit control commands for the driving unit 108 to the robot 100 as a wireless communication unit for communication with the robot 100. That is, the robot 100 and the robot control system 120 may transmit and receive data and commands through communication by way of the respective wireless communication units 102 and 310.

The I/O interface 340 may be a device for interfacing with an input device, such as a keyboard or a mouse, and an output device, such as a display or a speaker.

Also, in other example embodiments, the number of components in the robot control system 120 and the processor 320 may be greater than the number of illustrated components.

In an example embodiment, unprocessed data, including raw sensing data collected by the sensor unit 106 of the robot 100, may be received by the processor 320 through the communication unit 310, and the processor 320 may generate a control command (e.g., low-level control command) for the driving unit 108 of the robot 100 based on the sensing data received from the robot 100. The processor 320 may transmit the control command to the robot 100 through the communication unit 310, and may allow the driving unit 108 to be controlled according to the transmitted control command. The communication unit 310 may use a socket communication, a stream, a message queue, and the like for communication with the robot 100.

Meanwhile, as described above, the robot control system 120 may be configured to include the charging control system 80 for controlling charging of the robot 100. Here, the robot control system 120 may monitor a battery state of the robot 100, and may control the robot 100 of which charging is determined to be necessary to move to a nearest charging place (e.g., nearest access floor 50). For example, the robot 100 may move to coordinates indicated by the robot control system 120, and may reach the access floor 50. Alternatively, the robot 100 may recognize a marker associated with the access floor section 50 while moving to the coordinates indicated by the robot control system 120 and may reach the access floor 50. Alternatively, the robot 100 may recognize a nearby marker according to a command 'to move to the nearest access floor 50' from the robot control system 120, and may reach the access floor section 50 by moving to the access floor section 50 associated with the recognized marker.

The marker associated with the access floor section 50 will be further described below with reference to FIG. 5.

Description related to technical features made above with reference to FIGS. 1 and 2 may be applied as is to FIG. 3 and thus, repeated description is omitted.

Figure 4:
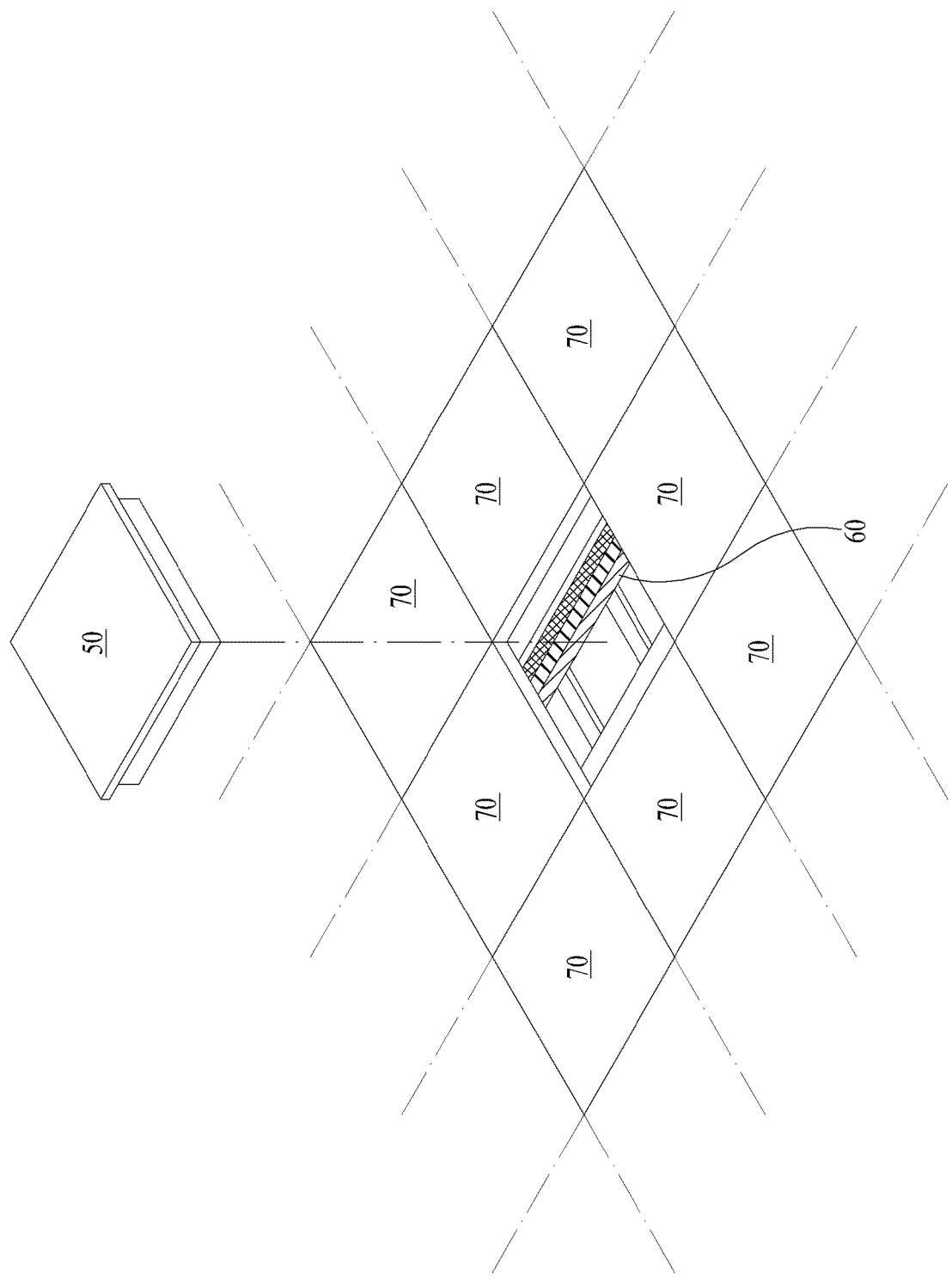
FIG. 4 illustrates a method of installing an access floor section that provides a wireless charging function for a robot on the floor according to an example.

FIG. 4 illustrates a method of installing an access floor section that provides a wireless charging function for a robot on the floor according to an example.

As illustrated, a plurality of general floor sections 70 may be arranged on the floor of the building 10 in which the access floor section 50 is installed. Other floor sections adjacent to the access floor section 50 may be the general floor sections 70.

The access floor section 50 may be installed on the floor, and it may be configured and arranged to be detachable for maintenance of the wiring/piping unit 60. That is, the access floor section 50 may be installed on the floor in a detachable manner to allow for maintenance of at least one of the power line 62, the communication line 64, and the ventilation/cooling line 66 under the floor. If the access floor section 50 is removed from the floor, access to the wiring/piping unit 60 may be facilitated. Depending on example embodiments, the access floor section 50 may be configured to include a hinge and accordingly, the access floor section 50 may be configured to be openable or closable with one side fixed.

The access floor section 50 removed from the floor may be relocated and installed at another location within the building 10 (at which the access floor section 50 is installable). That is, the access floor section 50 removed from the floor may be configured to be installable at another location on the floor by connecting the wireless charging unit 51 to the power line 62 under another location on the floor of the building 10, and by connecting the communication unit 52 to the communication line 64 under another location on the floor. That is, connectors of components of the access floor section 50 may be compatible with corresponding connectors of the wiring/piping unit 60 at another location in the building 10. Therefore, the access floor section 50 may be configured to be easily installed and relocated and then re-installed within the building 10 at another location.

Description related to technical features made above with reference to FIGS. 1 to 3 may be applied as is to FIG. 4 and thus, repeated description is omitted.

Figure 5:
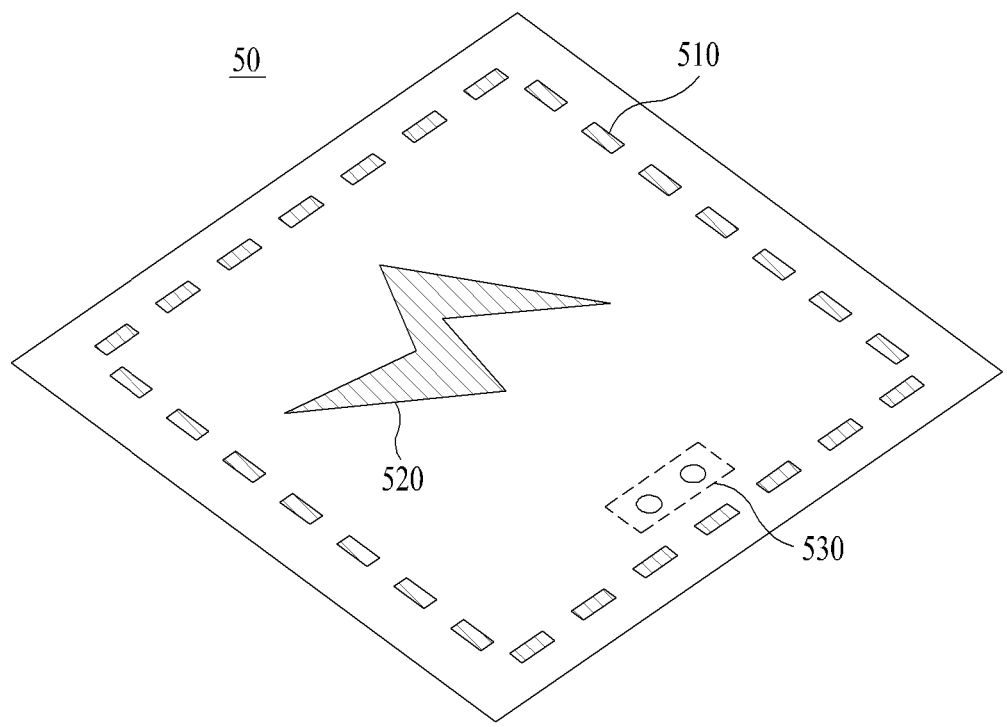
FIG. 5 illustrates an access floor section to which a marker for identification by a robot is applied according to an example.

FIG. 5 illustrates an access floor section to which a marker for identification by a robot is applied according to an example.

As illustrated, the access floor section 50 may include a marker 510 or 520 which is configured to be identifiable by the robot 100 to be charged.

The robot 100 of which charging is determined to be necessary and requested to move to the access floor section 50 may be controlled to move to a location within the marker 510, or it may be controlled to move to a location on the marker 520 (e.g., a location indicated by the marker).

The sensor unit 106 of the robot 100 may include a sensor or a camera (e.g., an IR sensor or an IR camera) for recognizing such a marker.

For example, the robot control system 120 may monitor a battery state of the robot 100 and may control the robot 100 of which charging is determined to be necessary to move to the nearest charging place (e.g., nearest access floor section 50). For example, the robot 100 may recognize the marker 510 or 520 associated with the access floor section 50 indicated by the robot control system 120 and may reach the access floor section 50. Alternatively, the robot 100 may recognize the nearby marker 510 or 520 according to a command 'to move to the nearest access floor 50' from the robot control system 120 and may reach the access floor section 50 by moving to the access floor section 50 associated with the recognized marker 510 or 520.

The marker 510 or 520 may be provided in a form recognizable by the robot 100 on a top surface (surface) exposed to the exterior of the access floor section 50. Alternatively, although not shown, the marker 510 or 520 may be provided in a form recognizable by the robot 100 in a ceiling area corresponding to the access floor section 50.

As the robot 100 recognizes the marker 510 or 520 and moves onto the access floor 50, the robot 100 may be charged by the wireless charging unit 51.

The marker 510 or 520 may be provided in a form capable of identifying the access floor section 50 that provides a charging function with the naked eye.

Alternatively, in certain example embodiments, the marker 510 or 520 may include an IR pattern that is not identifiable with the naked eye, and that is instead identifiable only by the robot 100. Here, the illustrated marker 510 or 520 may not be identified with the naked eye, but may be identified only by the sensor unit 106 of the robot 100.

The IR pattern may be projected by an IR pattern irradiation device that irradiates an IR onto the top surface on which the marker 510 or 520 of the access floor section 50 is provided. Meanwhile, when the marker 510 or 520 is provided in a form recognizable by the robot 100 in a ceiling area corresponding to the access floor 50, the IR pattern may be projected onto the ceiling area corresponding to the access floor 50. The IR pattern irradiation device may be provided at an appropriate location within the building 10 to project the IR pattern to a location at which the robot 100 may easily recognize the marker 510 or 520 in order to move to the access floor 50. The IR pattern irradiation device may be integrated with a lighting device that lights the interior of the building 10, or it may be provided at a location identical or adjacent to that of the lighting device.

As another example embodiment, the access floor section 50 may be configured to further include a wired charging unit 530, as indicated in FIG. 5. As illustrated, the wired charging unit 530 for charging the robot 100 in a wired manner may be further provided on the top surface exposed to the exterior of the access floor section 50.

The wired charging unit 530 may be (directly) connected to the power line 62 of the wiring/piping unit 60 installed under the floor. The wired charging unit 530 may include a terminal to which the robot 100 can be connected for charging. When a corresponding terminal of the robot 100 is connected to the terminal of the wired charging unit 530, the robot 100 may be charged.

The access floor section 50 may charge the robot 100 in a wired or wireless manner according to a type of the robot 100 (e.g., depending on whether the robot 100 supports wireless charging), or may charge the robot 100 in a wired or wireless manner in response to a command from the robot control system 120.

Alternatively, when the robot 100 is being wirelessly charged on the access floor 50, the wired charging unit 530 may be used to charge another robot. For example, the terminal of the wired charging unit 530 may be provided at a location to which another robot is accessible on a general floor section adjacent to the access floor section 50 (e.g., a corner side of the access floor 50). Therefore, although the access floor section 50 closest to the other robot different from the robot 100 of which charging is requested is the same access floor 50, wireless charging of the robot 100 and wired charging of the other robot 100 may be simultaneously performed on the access floor 50. Therefore, the robot 100 and the other robot may be charged together. As described above, a wired charging function and a wireless charging function of the access floor section 50 may simultaneously operate, and may be configured to simultaneously charge a plurality of robots.

Alternatively, the wired charging unit 530 may be used to charge the robot 100 at a high speed compared to the wireless charging unit 51. For example, when high-speed charging for the robot 100 is required under control from the robot control system 120, the robot 100 may be charged through connection to the wired charging unit 530.

When the access floor section 50 closest to the other robot different from the robot 100 of which charging is required is the same access floor section 50, a robot having a smaller residual battery capacity or a robot of which high-speed charging is requested from the robot control system 120 between the robot 100 and the other robot may be connected to the wired charging unit 530, and the remaining robot may be charged by the wireless charging unit 51.

Description related to technical features made above with reference to FIGS. 1 to 4 may be applied as is to FIG. 5 and thus, repeated description is omitted.

Further, the access floor section 50 of the example embodiment may be also be used as waiting area for the robot 100 when charging has been completed, or when a service provision of the robot is not required (or of which movement to a specific floor is not requested). Therefore, the robot 100 of which service/movement is not requested may be charged and when the service/movement is requested, the robot 100 may quickly move to a requested place.

The systems or the apparatuses described herein may be implemented using hardware components, software components, or some combination of the hardware components and the software components. For example, the apparatuses and the components described herein may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combinations thereof, for independently or collectively instructing or configuring the processing device to operate as desired. Software and/or data may be embodied in any type of machine, component, physical equipment, virtual equipment, a computer storage medium or device, to be interpreted by the processing device or to provide an instruction or data to the processing device. The software also may be distributed over network coupled computer systems so that the software is stored and executed in a distributed fashion. The software and data may be stored by one or more computer readable storage media.

The methods according to the above-described example embodiments may be configured in a form of program instructions performed through various computer devices and recorded in computer-readable media. The media may include, alone or in combination with program instructions, a data file, a data structure, and the like. The program instructions stored in the media may be specially designed and configured for the example embodiments or may be known and available for one skilled in computer software art. Examples of the media include magnetic media such as hard disks, floppy disks, and magnetic tapes; optical media such as CD-ROM and DVDs; magneto-optical media such as floptical disks; and hardware devices that are specially configured to store program instructions, such as read-only memory (ROM), random access memory (RAM), flash memory, and the like. Examples of the program instructions include a machine language code produced by a compiler and an advanced language code executable by a computer using an interpreter.

Although the example embodiments are described with reference to some specific example embodiments and accompanying drawings, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents.

Therefore, other implementations, other example embodiments, and equivalents of the claims are to be construed as being included in the claims.

What is claimed is:

1. An access floor installed on a floor of a building, the access floor comprising:
a wireless charging unit configured to wirelessly charge at least one robot moving in the building;
a communication unit configured to communicate with the at least one of robot and a charging control system that controls charging of the at least one robot, wherein the wireless charging unit is configured to connect to a power line under the floor, and the communication unit is configured to connect to a communication line under the floor; and a cooler configured to connect to a pipe under the floor, wherein
the pipe is configured and arranged for either cooling the building or for providing ventilation to the building,
the cooler is configured to cool the wireless charging unit when charging the at least one robot, and
the wireless charging unit, the communication unit, and the cooler are disposed between a top plate of the access floor and the floor of the building, the top plate of the access floor being a cover of the access floor.

2. The access floor of claim 1, wherein the wireless charging unit includes a wireless charging pad and a wireless charging transformer.

3. The access floor of claim 1, wherein the top plate of the access floor is exposed and is provided on the wireless charging unit, and
the top plate of the access floor is made of the same material as that of a top plate of a general floor installed on the floor of the building, the general floor being adjacent to the access floor and the top plate of the access floor being configured with the same specifications as the top plate of the general floor.

4. The access floor of claim 1, wherein the access floor is installed on the floor to be detachable for maintenance of the power line and the communication line, and
the access floor is configured to be installable at another location on the floor by connecting the wireless charging unit to a power line under another location on the floor and by connecting the communication unit to a communication line under another location on the floor.

5. The access floor of claim 1, wherein a marker recognizable by the at least one robot is provided on a top surface exposed to an area outside of the access floor, and
as the at least one robot recognizes the marker and moves on the access floor, the at least one robot is charged by the wireless charging unit.

6. The access floor of claim 1, wherein the pipe comprises a ventilation duct that is configured and arranged for ventilating the building as well as for cooling the wireless charging unit, via the cooler, using ventilation that flows through the ventilation duct.

7. The access floor of claim 1, wherein the pipe comprises a cooling line that is configured and arranged for cooling the building as well as for cooling the wireless charging unit, via the cooler.

8. The access floor of claim 7, wherein the cooling line is an air conditioning pipe configured and arranged for cooling the building.

9. The access floor of claim 7, wherein the cooling line is an air conditioning pipe configured and arranged for cooling the building using cooled air.

10. The access floor of claim 7, wherein the cooling line is an air conditioning pipe configured and arranged for cooling the building using a refrigerant.

11. An access floor installed on a floor of a building, the access floor comprising:
a wireless charging unit configured to wirelessly charge at least one robot moving in the building and connect to a power line under the floor; and
a communication unit configured to communicate with the at least one robot and a charging control system that controls charging of the at least one robot and connect to a communication line under the floor; and
a cooler configured to connect to a pipe under the floor, wherein
the pipe is configured and arranged for either cooling the building or for providing ventilation to the building,
a marker recognizable by the at least one robot is provided on a top surface exposed to an area outside of the access floor,
as the at least one robot recognizes the marker and moves on the access floor, the at least one robot is charged by the wireless charging unit,
the marker includes an infrared ray (IR) pattern that is unidentifiable with a naked eye and identifiable by the at least one robot,
the IR pattern is projected by an IR pattern irradiation device that irradiates an IR onto the top surface,
the cooler is configured to cool the wireless charging unit when charging the at least one robot, and
the wireless charging unit, the communication unit, and the cooler are disposed between a top plate of the access floor and the floor of the building, the top plate of the access floor being a cover of the access floor.

12. The access floor of claim 11, wherein the pipe comprises a ventilation duct that is configured and arranged for ventilating the building as well as for cooling the wireless charging unit, via the cooler, using ventilation that flows through the ventilation duct.

13. The access floor of claim 11, wherein the pipe comprises a cooling line that is configured and arranged for cooling the building as well as for cooling the wireless charging unit, via the cooler.

14. The access floor of claim 13, wherein the cooling line is an air conditioning pipe configured and arranged for cooling the building.

15. The access floor of claim 13, wherein the cooling line is an air conditioning pipe configured and arranged for cooling the building using cooled air.

16. The access floor of claim 13, wherein the cooling line is an air conditioning pipe configured and arranged for cooling the building using a refrigerant.

17. An access floor installed on a floor of a building, the access floor comprising:
a wireless charging unit configured to wirelessly charge at least one robot moving in the building and connect to a power line under the floor;
a communication unit configured to communicate with the at least one robot and a charging control system that controls charging of the at least one robot and connect to a communication line under the floor; and
a cooler configured to connect to a pipe under the floor, wherein
the pipe is configured and arranged for either cooling the building or for providing ventilation to the building,
a wired charging unit configured to charge the at least one robot in a wired manner is further provided on a top surface exposed to an area outside of the access floor,
the wired charging unit is connected to the power line,
the wired charging unit includes a terminal to which the at least one robot is connected for charging,
the cooler is configured to cool the wireless charging unit when charging the at least one robot, and
the wireless charging unit, the communication unit, and the cooler are disposed between a top plate of the access floor and the floor of the building, the top plate of the access floor being a cover of the access floor.

18. The access floor of claim 17, wherein the pipe comprises a ventilation duct that is configured and arranged for ventilating the building as well as for cooling the wireless charging unit, via the cooler, using ventilation that flows through the ventilation duct.

19. The access floor of claim 17, wherein the pipe comprises a cooling line that is configured and arranged for cooling the building as well as for cooling the wireless charging unit, via the cooler.

\* \* \* \* \*